United States Patent [19]
Eisinger

[11] Patent Number: 6,028,515
[45] Date of Patent: Feb. 22, 2000

[54] MOTION SENSITIVE CONTROL APPARATUS

[75] Inventor: Lee Eisinger, 29 N. Wheaton Rd., Akron, Ohio 44313

[73] Assignee: Lee Eisinger, Akron, Ohio

[21] Appl. No.: 09/195,063

[22] Filed: Nov. 18, 1998

[51] Int. Cl.[7] ................................................. G08B 13/00
[52] U.S. Cl. ...................... 340/541; 340/540; 340/545.2; 340/565
[58] Field of Search .................................... 340/540, 541, 340/545.2, 545.4, 548, 552, 565, 521, 522

[56] References Cited

U.S. PATENT DOCUMENTS

| | | | |
|---|---|---|---|
| 5,457,442 | 10/1995 | Lucero | 340/693 |
| 5,459,450 | 10/1995 | Beghelli | 340/538 |
| 5,555,454 | 9/1996 | Dees | 340/332 |
| 5,745,035 | 4/1998 | Deyo | 340/541 |
| 5,781,108 | 7/1998 | Jacob et al. | 340/552 |
| 5,877,957 | 3/1999 | Bennett | 364/191 |

*Primary Examiner*—Daniel J. Wu
*Assistant Examiner*—Toan Pham
*Attorney, Agent, or Firm*—Emerson & Associates; Roger D. Emerson; John M. Skeriotrs

[57] ABSTRACT

A motion sensitive control apparatus for turning on and turning off electrical devices. The apparatus turns on light sources or electrical devices in the presence of motion of one or more persons. The apparatus also turns off light sources or electrical devices in the absence of motion from one or more persons for a period of time. The apparatus produces an indication, such as a loud noise or flashing or bright light, to indicate when a light source or electrical device has been activated or deactivated by the apparatus. The apparatus also has backup components to ensure that the apparatus continues to operate in the event that primary components fail.

16 Claims, 4 Drawing Sheets

MOTION SENSITIVE CONTROL APPARATUS

BACKGROUND OF THE INVENTION

1. Field of Invention

This invention pertains to the art of methods and apparatuses for activatient and deactivating electrical devices, and more specifically to methods and apparatuses for activating electrical devices in the presence of motion and deactivating electrical devices in the absence of motion for a period of time. Additionally, a noticeable indication is produced when these actions occur.

2. Description of the Related Art

Basic motion sensor operated light sources and electrical devices are known in the related art. Generally, these apparatuses automatically activate a light source or electrical device when motion is detected within its range. These apparatuses can also deactivate the light source or electrical device when no motion is detected for a specific period of time.

The existing apparatuses of the related art have brought about a certain degree of convenience and protection for individuals, particularly the elderly. However, the apparatuses of the related art have often failed to signal when they have activated or deactivated a light source or electrical device. The apparatuses fail to provide a visual or audible indication that the light source or electrical device has been activated or deactivated. Furthermore, the apparatuses of the related art do not have backup or failsafe components that take over in the event that the primary apparatus fails.

The present invention contemplates a new and improved motion sensitive control apparatus which is simple in design, effective in use, and overcomes the foregoing difficulties and others while providing better and more advantageous overall results.

SUMMARY OF THE INVENTION

In accordance with the present invention, a new and improved motion sensitive control apparatus is provided which activates light sources or electrical devices in the presence of motion of one or more persons. The new apparatus also deactivates the light sources or electrical devices in the absence of motion from one or more persons for a period of time. The new and improved motion sensitive control apparatus also emits an indication, such as a loud noise or flashing or bright light, to indicate when a light source or electrical device has been activated due to the detection of motion by the motion detector. The new apparatus emits the same indication when a light source or electrical device has been deactivated by the apparatus due to a lapse of time during which no motion was detected by the motion detector. The indication acts as a reminder and alerts a person to the fact that a light source or electrical device has been activated or deactivated by the new apparatus. The new apparatus also has backup components which ensure that the apparatus continues to operate in the event that primary components fail.

For example, in a kitchen, if a coffee pot is plugged into the apparatus, the coffee pot would automatically be activated when someone walked into the kitchen. The indication produced by the apparatus would alert the person to the fact that the coffee pot had been activated. When the person left the kitchen and no motion was detected for a period of time, the coffee pot would automatically be deactivated. This is a useful feature for the elderly or individuals afflicted with Alzheimer's. The indication, of a loud noise, would be heard by the person, who is now in the living room, and remind them that the coffee pot had been deactivated. The person could then turn the coffee pot back on if they desired.

According to one aspect of the invention the motion sensitive control apparatus has a power supply means which allows the apparatus to be associated with a source of power. This may be a conventional electric chord which can be plugged into a conventional wall outlet or socket. The apparatus also has a motion detector means for detecting movement, a backup motion detector means for detecting movement, an indicating means, a backup indicating means, and an outlet means. The outlet means can be a conventional socket or outlet. The light sources or electrical devices controlled by the apparatus are connected to the apparatus by being plugged into the outlet means of the apparatus.

The outlet means of the apparatus is associated with the motion detector means and the backup motion detector means. Upon the detection of movement by the motion detector means, the light source or electrical device is activated. Upon the non-detection of motion by the motion detector means for a period of time T1, the light source or electrical device is deactivated. Should the motion detector means fail, the light source or electrical device is activated upon the detection of movement by the backup motion detector means and deactivated upon the non-detection of movement by the backup motion detector means for a period of time T2.

The indicating means is associated with the motion detector means and upon the detection of movement by the motion detector means the indicating means produces an indication. The indicating means produces the same indication upon the non-detection of movement by the motion detector means for the period of time T1. The backup indicating means is associated with the backup motion detector means. In the event that the motion detector means fails and upon the detection of movement by the backup motion detector means the backup indicating means produces an indication. The backup indicating means produces the same indication upon the non-detection of movement by the backup motion detector means for the period of time T2.

According to another aspect of the invention the indication produced can be loud noise or a flashing or bright light or any other indication. The indication acts as a reminder and alerts a person to the fact that the light source or electrical device associated with the apparatus has been activated or deactivated.

According to another aspect of the invention a solenoid can act as the indicating means and the backup indicating means.

According to another aspect of the invention the apparatus can have an adjustable load means associated with the power supply means for adjusting the amperage and voltage ranges in which the apparatus may be used. For example, the apparatus could be plugged into either a 110 or 220 volt power supply. The adjustable load means is also associated with the outlet means allowing electrical devices having various amperage and voltage operating ranges to be plugged into the apparatus. Thus, either a 110 volt coffee pot or a 220 volt dish-washer could be plugged into the outlet means.

According to another aspect of the invention a solenoid can act as the indicating means, the backup indicating means and the adjustable load means.

According to another aspect of the invention the apparatus has a first manual override adjustment means, second manual override adjustment means, third manual override adjustment means and fourth manual override adjustment means. These are associated with the motion detector means means, the backup motion detector means means, the indicating means and the backup indicating means, respectively. These permit a person to manually adjust one, some or all of these components.

For example, the indicating means and or the backup indication means could be turned off. Thus, the apparatus would not emit an indication when the coffee pot was activated or deactivated by the apparatus. The volume of a noise producing indicating means and or backup indicating means could be adjusted. Alternatively, the frequency or brightness of a flashing indicating means and or backup indicating means could be adjusted. Also, the sensitivity of the motion detector means and or the backup motion detector means could be adjusted or disabled entirely. Thus, after a party is over and the guests are gone and the only movement comes from the people cleaning up the kitchen, the motion detector means and the backup motion detector means could be disabled so that the coffee pot is not reactivated by the apparatus. Any other manual adjustment of any combination of these components could also be performed.

According to another aspect of the invention the apparatus has a variable timer associated with the motion detector means which permits the period of time T1 to be varied. The apparatus also has a backup variable timer associated with the backup motion detector means which permits the period of time T2 to be varied. This permits a person to adjust the period of time required to lapse before the apparatus deactivates the light source or electrical device.

According to another aspect of the invention the apparatus has a remote control varying means associated with the variable timer for remotably varying the period of time T1. The apparatus also has a backup remote control varying means associated with the backup variable timer for remotably varying the period of time T2.

According to another aspect of the invention the motion detector means further comprises the variable timer and the backup motion detector means further comprises the backup variable timer.

According to another aspect of the invention the motion detector means, the backup motion detector means, the indicating means and the backup indicating means are remotably movable from the apparatus.

According to another aspect of the invention the apparatus has a remote control means. The motion detector means and the backup motion detector means are associated with the apparatus by the remote control means. The indicating means is associated with the motion detector means by the remote control means. The backup indicating means is associated with the backup motion detector means by the remote control means. This permits one, some or all of these components to be moved away from the apparatus to a remote location.

For example, the indicating means and or the backup indicating means could be placed in another room. Thus, the indication could occur in the living room and alert the person in the living room that the coffee pot in the kitchen was activated by motion in the kitchen. The indication in the living room could remind the person in the living room that the coffee pot in the kitchen was just deactivated by the apparatus. Alternatively, the motion detector means and or the backup motion detector means could be moved to a location where motion would be detected such as the dining room. The motion in the dining room would keep the coffee pot activated.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
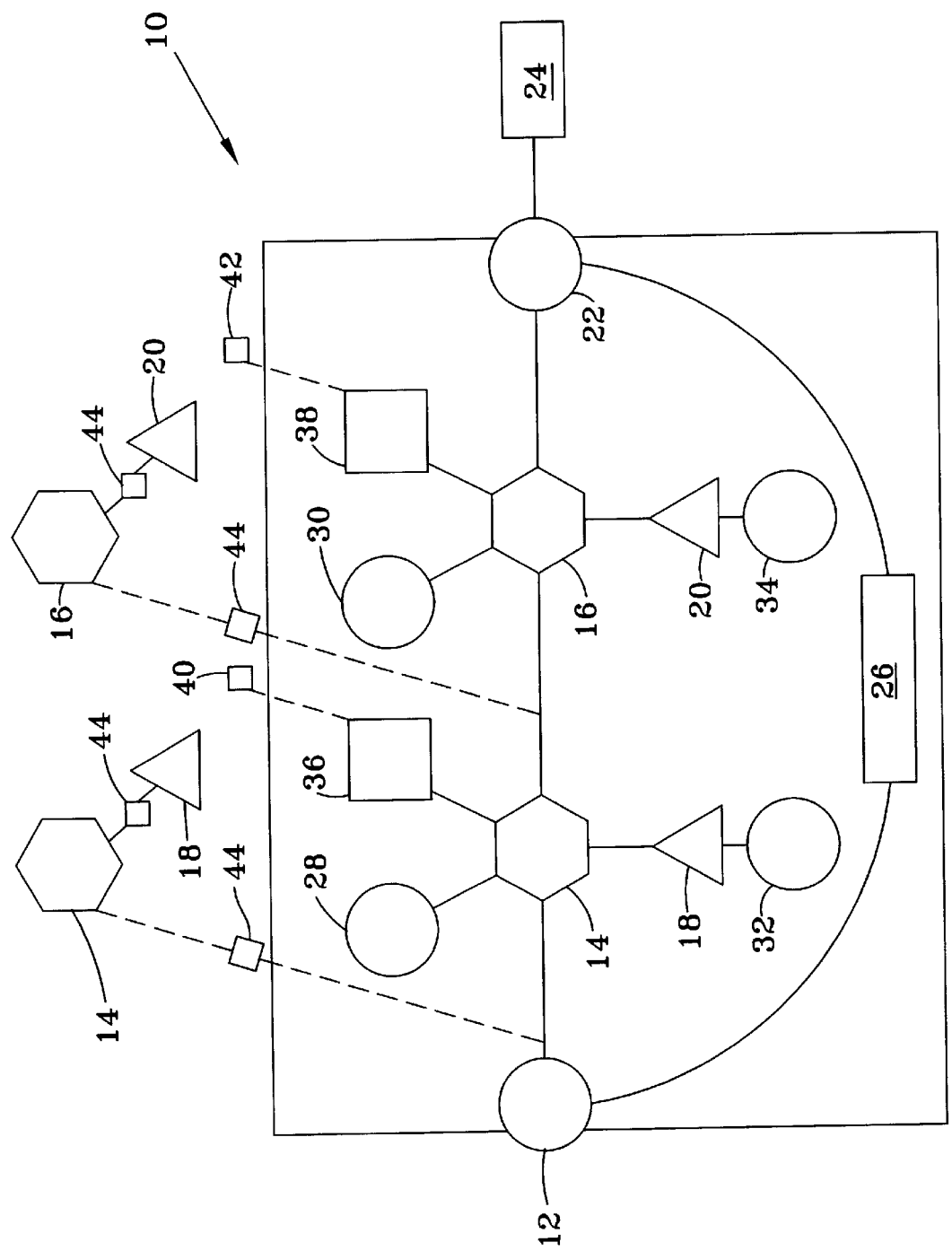
FIG. 1 is a schematic of the motion sensitive control apparatus.
Figure 2:
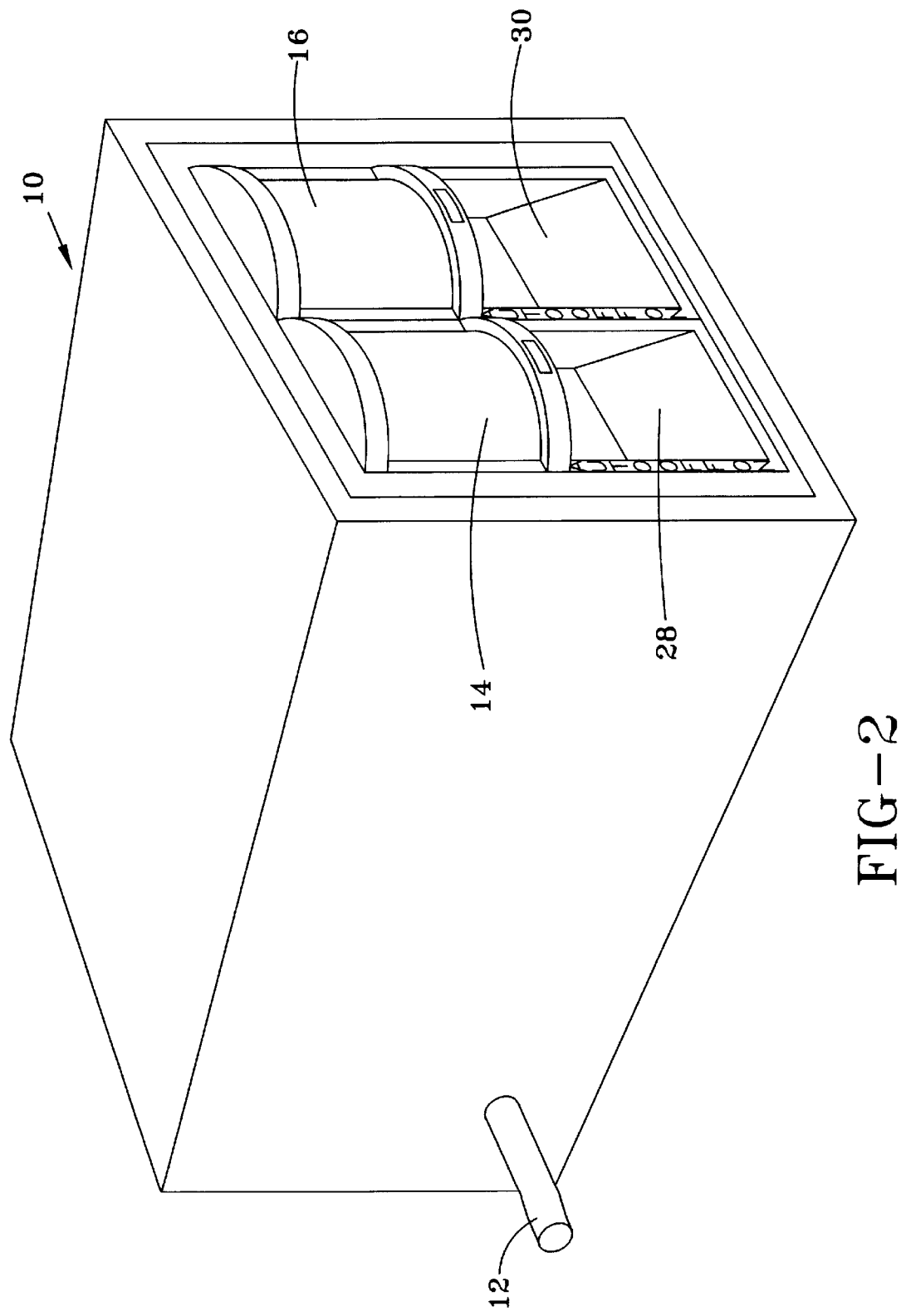
FIG. 2 is an isometric view of the apparatus.
Figure 4:
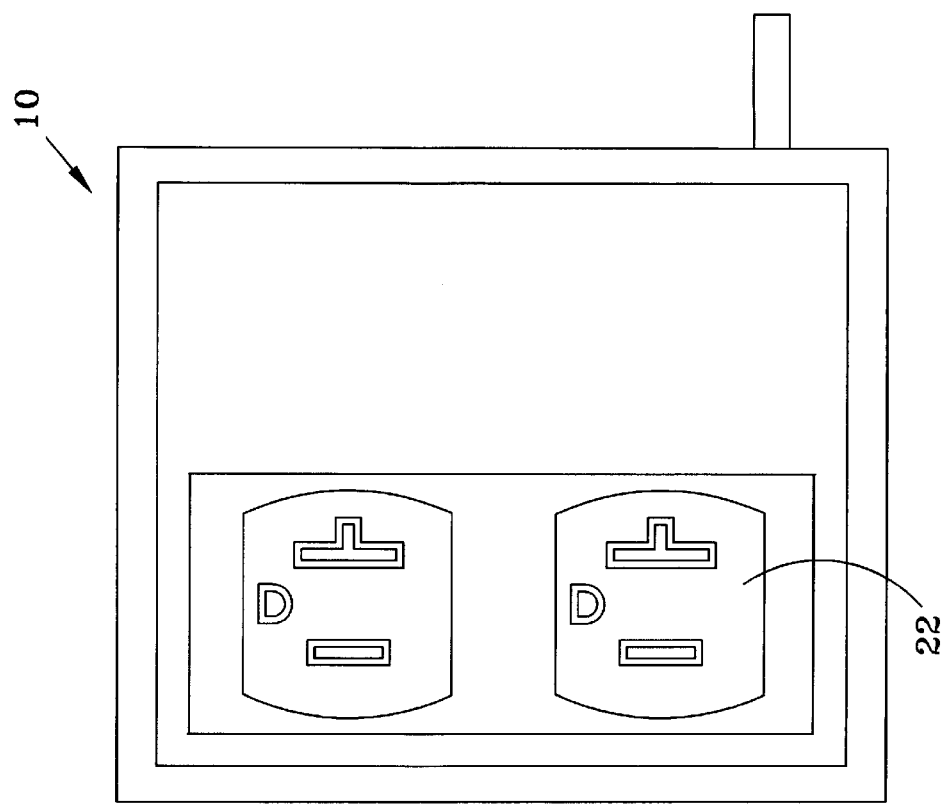
FIG. 4 is a rear view of the apparatus.
Figure 3:
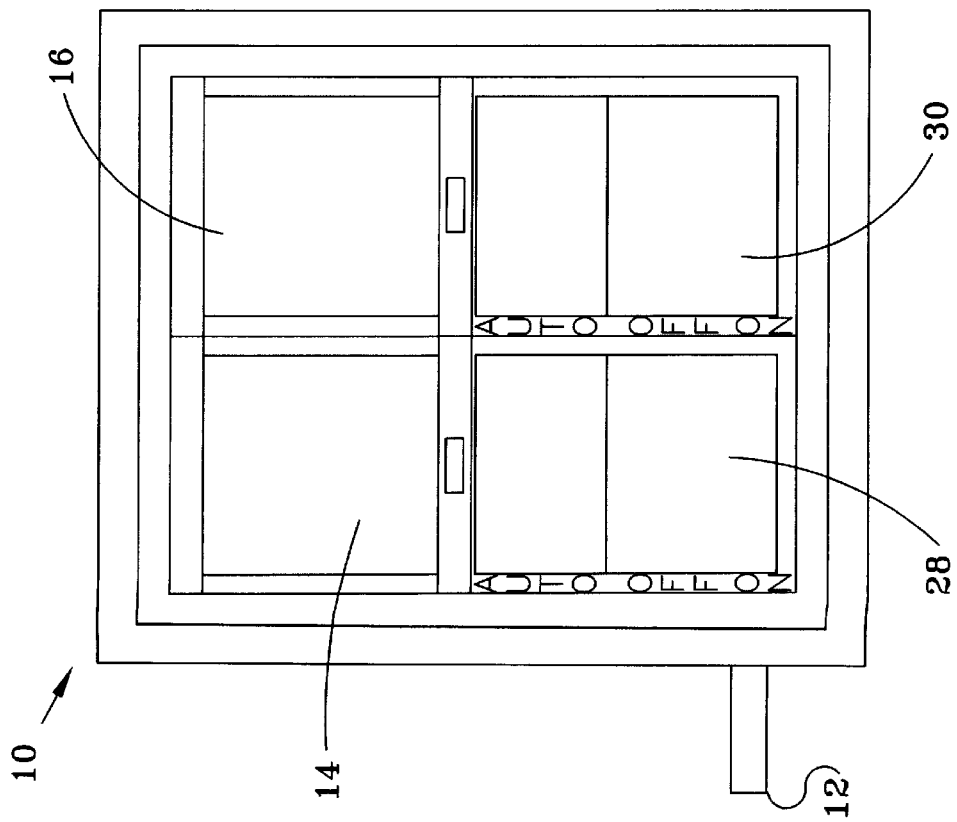
FIG. 3 is a front view of the apparatus.

Referring now to the drawings wherein the showings are for purposes of illustrating a preferred embodiment of the invention only and not for purposes of limiting the same, FIG. 1 shows a schematic of the preferred embodiment of the invention. As shown in FIGS. 1, 2, 3, and 4 the motion sensitive control apparatus 10 has a power supply means 12 for providing power to the apparatus 10. The apparatus 10 also has a motion detector means 14 for detecting movement, a backup motion detector means 16 for detecting movement, an indicating means 18, a backup indicating means 20, and an outlet means 22. The light sources or electrical devices 24 controlled by the apparatus 10 are connected to the apparatus 10 by being plugged into the outlet means 22 of the apparatus 10.

The outlet means 22 of the apparatus 10 is associated with the motion detector means 14 and the backup motion detector means 16. Upon the detection of movement by the motion detector means 14, the light source or electrical device 24 is activated. Upon the non-detection of motion by the motion detector means 14 for a period of time T1, the light source or electrical device 24 is deactivated. Should the motion detector means 14 fail, the light source or electrical device 24 is activated upon the detection of movement by the backup motion detector means 16 and deactivated upon the non-detection of movement by the backup motion detector means 16 for a period of time T2.

The indicating means 18 is associated with the motion detector means 14 and upon the detection of movement by the motion detector means 14 the indicating means 18 produces an indication. The indicating means 18 produces the same indication upon the non-detection of movement by the motion detector means 14 for the period of time T1. A backup indicating means 20 is associated with the backup motion detector means 16. In the event that the motion detector means 14 fails and upon the detection of movement by the backup motion detector means 16 the backup indicating means 20 produces an indication. The backup indicating means 20 produces the same indication upon the non-detection of movement by the backup motion detector means 16 for the period of time T2.

The indication produced can be loud noise or a flashing or bright light or any other indication. The indication acts as a reminder and alerts a person to the fact that the light source or electrical device 24 associated with the apparatus 10 has been activated or deactivated.

A solenoid can act as the indicating means 18 and the backup indicating means 20.

As shown in FIG. 1 the apparatus 10 can have an adjustable load means 26 associated with the power supply means 12 for adjusting the amperage and voltage ranges in which the apparatus 10 may be used. For example, the apparatus 10 could be plugged into either a 110 or 220 volt power supply. The adjustable load means 26 is also associated with the outlet means 22 allowing electrical device 24 having various amperage and voltage operating ranges to be plugged into the apparatus 10. Thus, either a 110 volt coffee pot or a 220 volt dish-washer could be plugged into the outlet means 22 of the apparatus 10.

Figure 5:
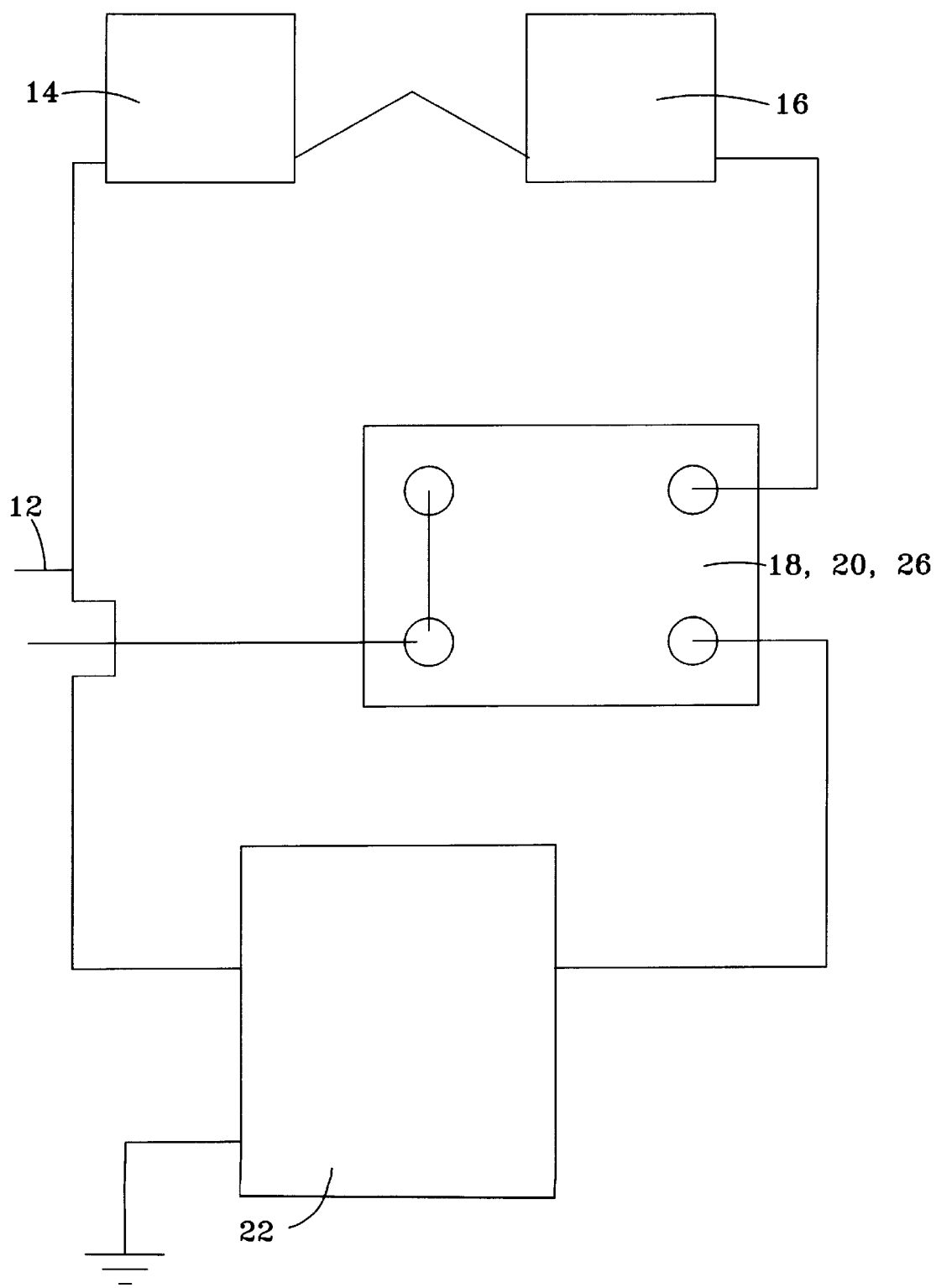
FIG. 5 is a schematic of the motion sensitive control apparatus where a solenoid comprises more than one of the invention's components.

As shown in FIG. 5 a solenoid can act as the indicating means 18, the backup indicating means 20 and the adjustable load means 26. This embodiment is an inexpensive design having fewer components.

As shown in FIG. 1 the apparatus 10 can have a first manual override adjustment means 28, second manual override adjustment means 30, third manual override adjustment means 32 and fourth manual override adjustment means 34. These are associated with the motion detector means 14 means, the backup motion detector means 16 means, the indicating means 18 and the backup indicating means 20, respectively. These permit a person to manually adjust one, some or all of these components.

For example, the indicating means 18 and or the backup indication means could be turned off. Thus, the apparatus 10 would not emit an indication when the coffee pot was activated or deactivated by the apparatus 10. The volume of a noise producing indicating means 18 and or backup indicating means 20 could be adjusted. Alternatively, the frequency or brightness of a flashing indicating means 18 and or backup indicating means 20 could be adjusted. Also, the sensitivity of the motion detector means 14 and or the backup motion detector means 16 could be adjusted or disabled entirely. Thus, after a party is over and the guests are gone and the only movement comes from the people cleaning up the kitchen, the motion detector means 14 and the backup motion detector means 16 could be disabled so that the coffee pot is not reactivated by the apparatus 10. Any other manual adjustment of any combination of these components could also be performed.

As shown in FIG. 1 the apparatus 10 can a variable timer 36 associated with the motion detector means 14 which permits the period of time T1 to be varied. The apparatus 10 cans also have a backup variable timer 38 associated with the backup motion detector means 16 which permits the period of time T2 to be varied. This permits a person to adjust the period of time required to lapse before the apparatus 10 deactivates the light source or electrical device 24.

As shown in FIG. 1 the apparatus 10 can a remote control varying means 40 associated with the variable timer 36 for remotably varying the period of time T1. The apparatus 10 can also have a backup remote control varying means 42 associated with the backup variable timer 38 for remotably varying the period of time T2.

The motion detector means 14 can further comprise the variable timer 36. The backup motion detector means 16 can further comprise the backup variable timer 38.

In yet another embodiment of the invention, shown in FIG. 1, the motion detector means 14, the backup motion detector means 16, the indicating means 18 and the backup indicating means 20 are remotably movable from the apparatus 10. In this embodiment the apparatus 10 has a remote control means 44. The motion detector means 14 and the backup motion detector means 16 are associated with the apparatus 10 by the remote control means 44. The indicating means 18 is associated with the motion detector means 14 by the remote control means 44. The backup indicating means 20 is associated with the backup motion detector means 16 by the remote control means 44. This permits one, some or all of these components to be moved away from the apparatus 10 to a remote location.

The preferred embodiments have been described, hereinabove. It will be apparent to those skilled in the art that the above methods may incorporate changes and modifications without departing from the general scope of this invention. For example, the new apparatus may have useful applications in the medical or home security fields. It is intended to include all such modifications and alterations in so far as they come within the scope of the appended claims or the equivalents thereof.

Having thus described the invention, it is now claimed:

1. An apparatus for activating and deactivating an electrical device, comprising:

power supply means for providing power to said apparatus;

motion detector means for detecting movement;

backup motion detector means for detecting movement;

outlet means for connecting said electrical device to said apparatus, said outlet means being operatively associated with said motion detector means and said backup motion detector means, said electrical device being selectively activated upon the detection of movement by said motion detector means, said electrical device being selectively activated upon the detection of movement by said backup motion detector means in the event that said motion detector means fails, said electrical device being selectively deactivated upon the non-detection of movement by said motion detector means for a period of time T1, said electrical device being selectively deactivated upon the non-detection of movement by said backup motion detector means for a period of time T2 in the event that said motion detector means fails;

indicating means operatively associated with said motion detector means, said indicating means selectively producing an indication upon the detection or non-detection of movement by said motion detector means; and, backup indicating means operatively associated with said backup motion detector means, said backup indicating means selectively producing an indication upon the detection or non-detection of movement by said backup motion detector means.

2. The apparatus of claim 1 wherein said indicating means and said backup indicating means produce an audible sound.

3. The apparatus of claim 1 wherein said indicating means and said backup indicating means comprise a solenoid.

4. The apparatus of claim 1 further comprising:

adjustable load means operatively associated with said power supply means for adjusting the amperage and voltage ranges in which said apparatus may be used, said adjustable load means also being operatively associated with said outlet means allowing the connection of electrical devices having various amperage and voltage operating ranges to said apparatus.

5. The apparatus of claim 4 wherein said indicating means, said backup indicating means and said adjustable load means comprise a solenoid.

6. The apparatus of claim 1 further comprising:

first manual override adjustment means, second manual override adjustment means, third manual override adjustment means and fourth manual override adjustment means operatively associated with said motion detector means, said backup motion detector means, said indicating means and said backup indicating means, respectively.

7. The apparatus of claim 1 further comprising:

variable timer operatively associated with said motion detector means for varying said period of time T1; and, backup variable timer operatively associated with said backup motion detector means for varying said period of time T2.

8. The apparatus of claim 7 further comprising:

remote control varying means operatively associated with said variable timer wherein said period of time T1 may be varied using said remote control varying means; and, backup remote control varying means operatively associated with said backup variable timer wherein said period of time T2 may be varied using said backup remote control varying means.

9. The apparatus of claim 7 wherein said motion detector means further comprises said variable timer and said backup motion detector means further comprises said backup variable timer.

10. The apparatus of claim 1 wherein said motion detector means, said backup motion detector means, said indicating means and said backup indicating means are remotably movable from said apparatus.

11. The apparatus of claim 10 further comprising:

remote control means, said motion detector means and said backup motion detector means being operatively associated with said apparatus by said remote control means, said indicating means being operatively associated with said motion detector means by said remote control means and said backup indicating means being operatively associated with said backup motion detector means by said remote control means.

12. An apparatus for activating and deactivating an electrical device, comprising:

power supply means for providing power to said apparatus;

motion detector means for detecting movement;

backup motion detector means for detecting movement;

outlet means for connecting said electrical device to said apparatus, said outlet means being operatively associated with said motion detector means and said backup motion detector means, said electrical device being selectively activated upon the detection of movement by said motion detector means, said electrical device being selectively activated upon the detection of movement by said backup motion detector means in the event that said motion detector means fails, said electrical device being selectively deactivated upon the non-detection of movement by said motion detector means for a period of time T1, said electrical device being selectively deactivated upon the non-detection of movement by said backup motion detector means for a period of time T2 in the event that said motion detector means fails;

indicating means operatively associated with said motion detector means, said indicating means selectively producing an indication upon the detection or non-detection of movement by said motion detector means;

backup indicating means operatively associated with said backup motion detector means, said backup indicating means selectively producing an indication upon the detection or non-detection of movement by said backup motion detector means, said indicating means and said backup indicating means producing an audible sound;

adjustable load means operatively associated with said power supply means for adjusting the amperage and voltage ranges in which said apparatus may be used, said adjustable load means also being operatively associated with said outlet means allowing the connection of electrical devices having various amperage and voltage operating ranges to said apparatus;

first manual override adjustment means, second manual override adjustment means, third manual override adjustment means and fourth manual override adjustment means operatively associated with said motion detector means, said backup motion detector means, said indicating means and said backup indicating means, respectively;

variable timer operatively associated with said motion detector means for varying said period of time T1;

backup variable timer operatively associated with said backup motion detector means for varying said period of time T2;

remote control varying means operatively associated with said variable timer wherein said period of time T1 may be varied using said remote control varying means;

backup remote control varying means operatively associated with said backup variable timer wherein said period of time T2 may be varied using said backup remote control varying means.

13. The apparatus of claim 12 wherein said indicating means, said backup indicating means and said adjustable load means comprise a solenoid.

14. The apparatus of claim 12 wherein said motion detector means further comprises said variable timer and said backup motion detector means further comprises said backup variable timer.

15. The apparatus of claim 12 wherein said motion detector means, said backup motion detector means, said indicating means and said backup indicating means are remotably movable from said apparatus.

16. The apparatus of claim 15 further comprising:

remote control means, said motion detector means and said backup motion detector means being operatively associated with said apparatus by said remote control means, said indicating means being operatively associated with said motion detector means by said remote control means and said backup indicating means being operatively associated with said backup motion detector means by said remote control means.

* * * * *